(12) United States Patent
Sung

(10) Patent No.: US 8,064,524 B2
(45) Date of Patent: Nov. 22, 2011

(54) DE-INTERLACING METHOD AND APPARATUS USING REMOTE INTERPOLATION

(75) Inventor: Lien-Hsiang Sung, Taipei (TW)

(73) Assignee: Via Technologies, Inc., Taipei (TW)

( * ) Notice: Subject to any disclaimer, the term of this patent is extended or adjusted under 35 U.S.C. 154(b) by 1106 days.

(21) Appl. No.: 11/853,032

(22) Filed: Sep. 11, 2007

(65) Prior Publication Data

US 2009/0041388 A1    Feb. 12, 2009

(30) Foreign Application Priority Data

Aug. 10, 2007 (TW) .............................. 96129615 A

(51) Int. Cl.
*H04N 7/12* (2006.01)

(52) U.S. Cl. .......... 375/240.17; 375/240.12; 375/240.14; 375/240.15; 375/240.16; 375/240.18; 375/240.13; 382/232; 382/234; 382/236; 382/300; 348/452; 348/448

(58) Field of Classification Search ........................ None
See application file for complete search history.

(56) References Cited

U.S. PATENT DOCUMENTS

2004/0119884 A1* 6/2004 Jiang .............................. 348/448
2006/0215058 A1* 9/2006 Lu et al. ........................ 348/452

* cited by examiner

*Primary Examiner* — Edan Orgad
*Assistant Examiner* — Canh Le
(74) *Attorney, Agent, or Firm* — Perkins Coie LLP; Aaron Wininger

(57) ABSTRACT

The present invention is directed to de-interlacing method and apparatus using remote interpolation. An up window and a down window are firstly determined. The closest pair of pixels of the up window and the down window along a direction of 90°, −45°, and 45° is determined, which is then used to interpolate a new pixel. Subsequently, the up window and the down window are moved or stayed according to which pair is determined as being closest.

18 Claims, 5 Drawing Sheets

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| 0 | 0 | 0 | 0 | 0 | 0 | 10 | 10 | 10 | 10 | 20 | 20 | 20 | 20 |
| 0 | 0 | 0 |   |   |   |    |    |    |    |    |    |    |    |
| 0 | 0 | 10 | 10 | 10 | 10 | 20 | 20 | 20 | 20 | 30 | 30 | 30 | 30 |

FIG. 4C

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| 0 | 0 | 0 | 0 | 0 | 0 | 10 | 10 | 10 | 10 | 20 | 20 | 20 | 20 |
| 0 | 0 | 0 | 0 |   |   |    |    |    |    |    |    |    |    |
| 0 | 0 | 10 | 10 | 10 | 10 | 20 | 20 | 20 | 20 | 30 | 30 | 30 | 30 |

FIG. 4D

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| 0 | 0 | 0 | 0 | 0 | 0 | 10 | 10 | 10 | 10 | 20 | 20 | 20 | 20 |
| 0 | 0 | 0 | 0 | 10 |   |    |    |    |    |    |    |    |    |
| 0 | 0 | 10 | 10 | 10 | 10 | 20 | 20 | 20 | 20 | 30 | 30 | 30 | 30 |

FIG. 4E

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| 0 | 0 | 0 | 0 | 0 | 0 | 10 | 10 | 10 | 10 | 20 | 20 | 20 | 20 |
| 0 | 0 | 0 | 0 | 10 | 10 |   |   |   |   |    |    |    |    |
| 0 | 0 | 10 | 10 | 10 | 10 | 20 | 20 | 20 | 20 | 30 | 30 | 30 | 30 |

FIG. 4F

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | 0 | 0 | 0 | 0 | 0 | 0 | 10 | 10 | 10 | 10 | 20 | 20 | 20 | 20 |
| | 0 | 0 | 0 | 0 | 10 | 10 | 10 | | | | | | | |
| | 0 | 0 | 10 | 10 | 10 | 10 | 20 | 20 | 20 | 20 | 30 | 30 | 30 | 30 |

FIG. 4G

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | 0 | 0 | 0 | 0 | 0 | 0 | 10 | 10 | 10 | 10 | 20 | 20 | 20 | 20 |
| | 0 | 0 | 0 | 0 | 10 | 10 | 10 | 10 | | | | | | |
| | 0 | 0 | 10 | 10 | 10 | 10 | 20 | 20 | 20 | 20 | 30 | 30 | 30 | 30 |

FIG. 4H

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | 0 | 0 | 0 | 0 | 0 | 0 | 10 | 10 | 10 | 10 | 20 | 20 | 20 | 20 |
| | 0 | 0 | 0 | 0 | 10 | 10 | 10 | 10 | 20 | 20 | 20 | 20 | 25 | 25 |
| | 0 | 0 | 10 | 10 | 10 | 10 | 20 | 20 | 20 | 20 | 30 | 30 | 30 | 30 |

DE-INTERLACING METHOD AND APPARATUS USING REMOTE INTERPOLATION

BACKGROUND OF THE INVENTION

1. Field of the Invention

The present invention generally relates to de-interlacing, and more particularly to de-interlacing using remote interpolation.

2. Description of the Prior Art

Most broadcasting television signals, such as NTSC, PAL or SECOM, are interlaced to display odd-field and even-field in turn, which are perceived as a whole frame due to persistence of vision. Interlaced video signals could be satisfactorily broadcast without consuming much bandwidth, but disadvantageously have reduced vertical resolution, line or area flicker. The video signals for computer displays, on the other hand, are non-interlaced or progressive to directly display the whole frame on the display.

In order to display the interlaced video signals on a progressive-type display, such as a computer display, the interlaced video signals should be transformed into non-interlaced or progressive video signals through a de-interlacing or line doubling process. Through the de-interlacing, the original odd-field and even-field are combined into a frame.

Video signals are conventionally de-interlaced through spatial, temporal, or spatial-temporal transformation. In the spatial transformation (also known as intra-field transformation), pixel/sample or pixels/samples in the same field are used to generate or insert new pixel. In the temporal transformation (also known as inter-field transformation), pixels in neighboring fields respectively are used to generate new pixel. In the spatial-temporal transformation, the spatial and the temporal transformations are collectively used to generate new pixel.

Among the various transformations mentioned above, the spatial transformation is a basic and important one, in particularly when scene change exists or the temporal transformation is unsatisfactory. One of the fundamental principles of the spatial transformation is to interpolate a new pixel from neighboring pixel or pixels based on the correlation relationship among the new pixel to be interpolated and the neighboring pixels.

FIG. 1A and FIG. 1B illustrate a conventional interpolation in which line n−1 and line n+1 are neighboring lines of a field, and line n is a new line to be interpolated from the line n−1 and the line n+1. Specifically, in FIG. 1A, a new pixel X is interpolated from neighboring pixels of columns k−1, k, and k+1, as being illustratively shaded. In FIG. 1B, another new pixel X+1 is interpolated from neighboring pixels of columns k, k+1, and k+2, as being illustratively shaded.

The conventional interpolation discussed above disadvantageously results in serrate or blurred line, particularly along an edge. Accordingly, a need has arisen to propose a novel transformation or interpolation to procure smooth line in the de-interlacing.

SUMMARY OF THE INVENTION

In view of the foregoing, the present invention provides a de-interlacing method and apparatus procuring smooth line rather than serrate or blurred line in the de-interlacing.

According to one embodiment, a number of pixels above a new pixel to be interpolated constitute an up window, and a number of pixels below the new pixel constitute a down window. The pixels along a vertical direction with respect to horizontal are used to interpolate the new pixel when values of the pixels are closest to each other, followed by moving the up window and the down window respectively one step to the right. The pixels along a direction that is at a negative angle with respect to horizontal are used to interpolate the new pixel when values of the pixels are closest to each other, followed by moving the down window at least two steps to the right while staying the up window. The pixels along a direction that is at a positive angle with respect to horizontal are used to interpolate the new pixel when values of the pixels are closest to each other, followed by moving the up window at least two steps to the right while staying the down window.

BRIEF DESCRIPTION OF THE DRAWINGS

FIG. 1A and FIG. 1B illustrate a conventional interpolation;

FIGS. 2A-2B illustrate windows for interpolation according to the present embodiment;

FIG. 3 shows a flow diagram according to one embodiment of the present invention;

FIG. 4A to FIG. 4I illustrate the performance of the remote interpolation of the present embodiment in chronological sequence.

DETAILED DESCRIPTION OF THE INVENTION

A de-interlacing transformation using a novel interpolation is proposed according to one embodiment of the present invention, for procuring new pixel from interlaced video signals in a field.

Figures 1A, 1B, 2A, 2B:
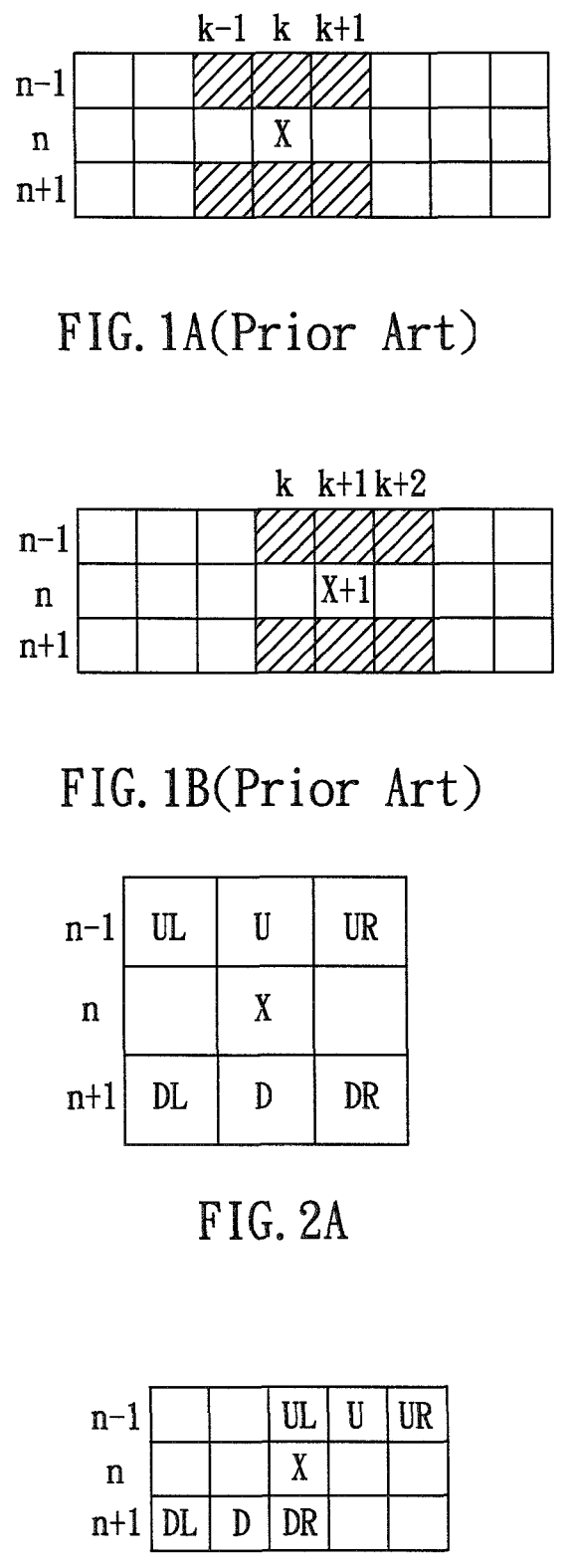

FIGS. 2A-2B illustrate windows for interpolation according to the present embodiment. In FIG. 2A, an up left pixel UL, an up pixel U, and an up right pixel UR constitute an up window; a down left pixel DL, a down pixel D, and a down right pixel DR constitute a down widow. It is appreciated by those skilled in the art that the number of pixels of the up window or the down window is not limited to three, even the up window and the down window are respectively constituted of three pixels in the present embodiment. In FIG. 2B, it is noted that the up window (UL, U, UR) is not right above the new pixel X, and the down window (DL, D, DR) is not right below the new pixel X, where one of the windows is, usually, in front of the other window. Accordingly, the embodiment of the present invention is named as remote interpolation, in contrast to the conventional local interpolation, such as that shown in FIGS. 1A-1B.

The up window and the down window of either FIG. 2A or FIG. 2B establish three pairs of pixels: (1) the vertical edge direction of 90° connecting the up pixel U and the down pixel D; (2) the edge direction of −45° connecting the up left pixel UL and the down right pixel DR; and (3) the edge direction of 45° connecting the up right pixel UR and the down left pixel DL.

Figures 3, 4A, 4B:
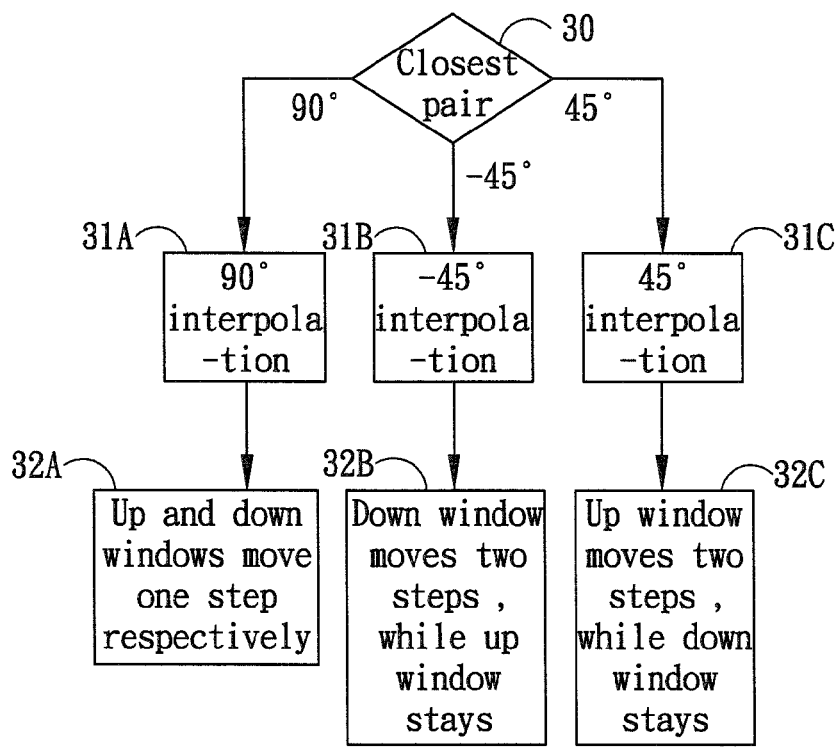

FIG. 3 shows a flow diagram according to one embodiment of the present invention. At the outset, a determination is made to find out which one of the three pairs is the closest one in which the pixels are most closest to each other in their brightness (or luma) (step 30). In other words, the closest pair has smallest pixels brightness difference. It is appreciated by those skilled in the art that video component other than the brightness/luma could be used in step 30. For example, chroma component representing color information could be determined in step 30. The determination of the step 30 is followed by one of the following:

(a) when a pixel of the up window and a pixel of the down window constitute an edge direction that is vertical (or of 90°) with respect to the horizontal (for example, the up pixel U of the up window and the down pixel D of the down window along the vertical edge direction of 90°) and is determined as the closest pair, the pixels of this pair are then used to interpolate the new pixel (step 31A). For example, the brightness of the up pixel U and the brightness of the down pixel D are averaged (=(U+D)/2) as the brightness of the new pixel. Subsequently, the up window and the down window move one step (i.e., a distance between two neighboring pixels on a horizontal line) or more to the right respectively (step 32A), and the new windows are ready for the interpolation of another pixel X+1. It is noted that the edge direction connecting the up pixel U and the down pixel D in FIG. 2B is regarded on purpose as being vertical with respect to horizontal in the embodiment.

(b) when a pixel of the up window and a pixel of the down window constitute an edge direction that is at a negative angle with respect to the horizontal (for example, the up left pixel UL of the up window and the down right pixel DR of the down window along the edge direction of −45°) and is determined as the closest pair, the pixels of this pair are then used to interpolate the new pixel (step 31B). For example, the brightness of the up left pixel UL and the brightness of the down right pixel DR are averaged (=(UL+DR)/2) as the brightness of the new pixel. Subsequently, the down window moves two steps or more to the right while the up window stays without moving (step 32B), and the new windows are ready for the interpolation of another pixel X+1.

(c) when a pixel of the up window and a pixel of the down window constitute an edge direction that is at a positive angle with respect to the horizontal (for example, the up right pixel UR of the up window and the down left pixel DL of the down window along the edge direction of 45°) and is determined as the closest pair, the pixels of this pair are then used to interpolate the new pixel (step 31C). For example, the brightness of the up right pixel UR and the brightness of the down left pixel DL are averaged (=(UR+DL)/2) as the brightness of the new pixel. Subsequently, the up window moves two steps or more to the right while the down window stays without moving (step 32C), and the new windows are ready for the interpolation of another pixel X+1.

In the present embodiment, when two or more pairs of pixels are determined as being closest, the rule (a) has highest priority over other rules, while the rule (c) has the least priority. It is appreciated that other order of priority could be adapted in other embodiments.

For better understanding the present embodiment, the performance of the remote interpolation of the present embodiment is illustrated in chronological sequence in FIG. 4A to FIG. 4I. In the exemplary drawings, the first line (or row) and the third line are original neighboring lines of a field, and the second line is a new line to be interpolated from the first line and the third line. The numerals above the first line indicate the sequence of the new pixels of the new line, and the value in each pixel space indicates corresponding brightness.

FIG. 4A shows the interpolation of a pixel with order numeral 0. The column to the left of the first column is extended by inserting same pixel value neighboring to the right. In this stage, the values 0, 0, 0 (indicated by the dotted box) corresponding to the pixels UL, U, UR constitute the up window, and values 0, 0, 0 (indicated by the dotted box) corresponding to the pixels DL, D, DR constitute the down window. According to rule (a), the pixels along the vertical edge direction of 90° is determined as being closest in brightness, and accordingly the pixels (i.e., the pixels U and D) are used to interpolate a new pixel. For example, the brightness of the up pixel U and the brightness of the down pixel D are averaged, resulting in an average 0 (=(0+0)/2) as the brightness of the new pixel. Subsequently, the up window and the down window move one step to the right respectively, as shown in FIG. 4B.

FIG. 4B shows the interpolation of a pixel with order numeral 1. In this stage, the values 0, 0, 0 (indicated by the dotted box) corresponding to the pixels UL, U, UR constitute the up window, and values 0, 0, 10 (indicated by the dotted box) corresponding to the pixels DL, D, DR constitute the down window. According to rule (a), the pixels along the vertical edge direction of 90° is determined as being closest in brightness, and accordingly the pixels (i.e., the pixels U and D) are used to interpolate a new pixel. For example, the brightness of the up pixel U and the brightness of the down pixel D are averaged, resulting in an average 0 (=(0+0)/2) as the brightness of the new pixel. Subsequently, the up window and the down window move one step to the right respectively, as shown in FIG. 4C.

FIG. 4C shows the interpolation of a pixel with order numeral 2. In this stage, the values 0, 0, 0 (indicated by the dotted box) corresponding to the pixels UL, U, UR constitute the up window, and values 0, 10, 10 (indicated by the dotted box) corresponding to the pixels DL, D, DR constitute the down window. According to rule (c), the pixels along the edge direction of 45° is determined as being closest in brightness, and accordingly the pixels (i.e., the pixels UR and DL) are used to interpolate a new pixel. For example, the brightness of the up right pixel UR and the brightness of the down left pixel DL are averaged, resulting in an average 0 (=(0+0)/2) as the brightness of the new pixel. Subsequently, the up window moves two steps to the right while the down window stays (without movement), as shown in FIG. 4D.

FIG. 4D shows the interpolation of a pixel with order numeral 3. In this stage, the values 0, 0, 0 (indicated by the dotted box) corresponding to the pixels UL, U, UR constitute the up window, and values 0, 10, 10 (indicated by the dotted box) corresponding to the pixels DL, D, DR constitute the down window. According to rule (c), the pixels along the edge direction of 45° is determined as being closest in brightness, and accordingly the pixels (i.e., the pixels UR and DL) are used to interpolate a new pixel. For example, the brightness of the up right pixel UR and the brightness of the down left pixel DL are averaged, resulting in an average 0 (=(0+0)/2) as the brightness of the new pixel. Subsequently, the up window moves two steps to the right while the down window stays (without movement), as shown in FIG. 4E.

FIG. 4E shows the interpolation of a pixel with order numeral 4. In this stage, the values 0, 10, 10 (indicated by the dotted box) corresponding to the pixels UL, U, UR constitute the up window, and values 0, 10, 10 (indicated by the dotted box) corresponding to the pixels DL, D, DR constitute the down window. According to rule (a), the pixels along the vertical edge direction of 90° is determined as being closest in brightness, and accordingly the pixels (i.e., the pixels U and D) are used to interpolate a new pixel. For example, the brightness of the up pixel U and the brightness of the down pixel D are averaged, resulting in an average 10 (=(10+10)/2) as the brightness of the new pixel. Subsequently, the up window and the down window move one step to the right respectively, as shown in FIG. 4F. The rest may be deduced by analogy for the pixels with order numerals 5, 6, and 7 as shown in FIGS. 4F, 4G, and 4H. FIG. 4I shows the result as a whole new line has been interpolated.

Figure 5:
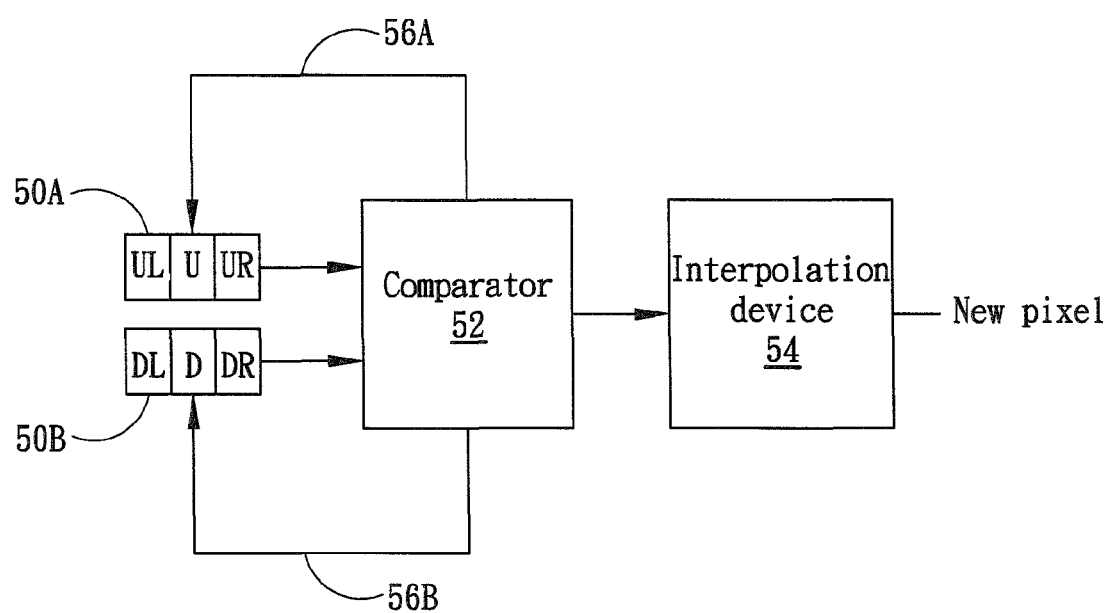
FIG. 5 illustrates a block diagram according to one embodiment of the present invention.

FIG. 5 illustrates a block diagram according to one embodiment of the present invention. At least three pixels are temporarily stored in an up window storage (such as a buffer) 50A as the up window, and at least three pixels are temporarily stored in a down window storage (such as a buffer) 50B as the down window. Three pairs of pixels (i.e., (1) the up pixel U and the down pixel D along the vertical edge direction; (2) the up left pixel UL and the down right pixel DR along the edge direction of −45°; (3) the up right pixel UR and the down left pixel DL along the edge direction of 45°) are determined in a comparator 52 to find out the closest one in which the pixels are most closest to each other in their values. The closest pair is fed to an interpolation device 54 to perform interpolation by, for example, averaging the two pixels, therefore generating a new pixel. The comparator 52 controls the movement or stay of pixels in the window storage 50A and 50B via control signals 56A and 56B according to its comparison result and the rules (a), (b), and (c). Subsequently, the new windows are ready for the interpolation of another pixel to the right.

Although specific embodiments have been illustrated and described, it will be appreciated by those skilled in the art that various modifications may be made without departing from the scope of the present invention, which is intended to be limited solely by the appended claims.

What is claimed is:

1. A de-interlacing method using remote interpolation, comprising:
    a plurality of pixels above a new pixel to be interpolated constituting an up window, and a plurality of pixels below the new pixel constituting a down window;
    using the pixels along a vertical direction with respect to horizontal to interpolate the new pixel when values of the pixels are closest to each other, followed by moving the up window and the down window respectively one step to the right, wherein the step is distance between two neighboring pixels on a horizontal line;
    using the pixels along a direction that is at a negative angle with respect to horizontal to interpolate the new pixel when values of the pixels are closest to each other, followed by moving the down window at least two steps to the right while staying the up window; and
    using the pixels along a direction that is at a positive angle with respect to horizontal to interpolate the new pixel when values of the pixels are closest to each other, followed by moving the up window at least two steps to the right while staying the down window.

2. The method according to claim 1, wherein the up window or the down window is not located right above or right below the new pixel.

3. The method according to claim 1, wherein the up window includes an up left pixel (UL), an up pixel (U), and an up right pixel (UR); and the down window includes a down left pixel (DL), a down pixel (D), and a down right pixel (DR).

4. The method according to claim 3, wherein the vertical direction has 90° with respect to horizontal, and the pixels along the vertical direction include the up pixel (U) and the down pixel (D).

5. The method according to claim 4, wherein the up pixel (U) and the down pixel (D) are averaged as the new pixel when the pixels along the direction of 90° are closest to each other.

6. The method according to claim 3, wherein the direction that is at the negative angle has −45° with respect to horizontal, and the pixels along the direction include the up left pixel (UL) and the down right pixel (DR).

7. The method according to claim 6, wherein the up left pixel (UL) and the down right pixel (DR) are averaged as the new pixel when the pixels along the direction of −45° are closest to each other.

8. The method according to claim 3, wherein the direction that is at the positive angle has 45° with respect to horizontal, and the pixels along the direction include the up right pixel (UR) and the down left pixel (DL).

9. The method according to claim 8, wherein the up right pixel (UR) and the down left pixel (DL) are averaged as the new pixel when the pixels along the direction of 45° are closest to each other.

10. De-interlacing apparatus using remote interpolation, comprising:
    two window storages for respectively temporarily storing pixels as an up window and a down window;
    a comparator for determining closest one of a plurality of pairs of pixels, which include:
        the pair of the pixels along a vertical direction with respect to horizontal;
        the pair of the pixels along a direction that is at a negative angle with respect to horizontal; and
        the pair of the pixels along a direction that is at a positive angle with respect to horizontal;
    an interpolation device for interpolating a new pixel from the closest pair, wherein
        the pixels along the vertical direction with respect to horizontal are used to interpolate the new pixel when values of the pixels are closest to each other;
        the pixels along the direction that is at the negative angle with respect to horizontal are used to interpolate the new pixel when values of the pixels are closest to each other; and
        the pixels along the direction that is at the positive angle with respect to horizontal are used to interpolate the new pixel when values of the pixels are closest to each other;
    wherein the comparator controls movement of the pixels in the window storages via control signals according to resultant determination thereof, wherein
        the up window and the down window are moved respectively one step to the right when the pixels along the vertical direction are closest to each other, wherein the step is distance between two neighboring pixels on a horizontal line;
        the down window is moved at least two steps to the right while the up window stays when the pixels along the direction that is at the negative angle are closest to each other; and
        the up window is moved at least two steps to the right while the down window stays when the pixels along the direction that is at the positive angle are closest to each other.

11. The apparatus according to claim 10, wherein the up window or the down window is not located right above or right below the new pixel.

12. The apparatus according to claim 10, wherein the up window includes an up left pixel (UL), an up pixel (U), and an up right pixel (UR); and the down window includes a down left pixel (DL), a down pixel (D), and a down right pixel (DR).

13. The apparatus according to claim 12, wherein the vertical direction has 90° with respect to horizontal, and the pixels along the vertical direction include the up pixel (U) and the down pixel (D).

14. The apparatus according to claim 13, wherein the up pixel (U) and the down pixel (D) are averaged as the new pixel when the pixels along the direction of 90° are closest to each other.

15. The apparatus according to claim 12, wherein the direction that is at the negative angle has −45° with respect to horizontal, and the pixels along the direction include the up left pixel (UL) and the down right pixel (DR).

16. The apparatus according to claim 15, wherein the up left pixel (UL) and the down right pixel (DR) are averaged as the new pixel when the pixels along the direction of −45° are closest to each other.

17. The apparatus according to claim 12, wherein the direction that is at the positive angle has 45° with respect to horizontal, and the pixels along the direction include the up right pixel (UR) and the down left pixel (DL).

18. The apparatus according to claim 17, wherein the up right pixel (UR) and the down left pixel (DL) are averaged as the new pixel when the pixels along the direction of 45° are closest to each other.

* * * * *